United States Patent
Parkinson et al.

(10) Patent No.: US 10,300,686 B2
(45) Date of Patent: May 28, 2019

(54) SELF-RECYCLABLE BARRIER PACKAGING

(71) Applicant: Dow Global Technologies LLC, Midland, MI (US)

(72) Inventors: Shaun Parkinson, Tarragona (ES); Didem Oner-Deliormanli, Bellaire, TX (US); Carolina Chirinos, Tarragona (ES); Brian W. Walther, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 140 days.

(21) Appl. No.: 15/522,177

(22) PCT Filed: Nov. 10, 2015

(86) PCT No.: PCT/US2015/059972
§ 371 (c)(1),
(2) Date: Apr. 26, 2017

(87) PCT Pub. No.: WO2016/109023
PCT Pub. Date: Jul. 7, 2016

(65) Prior Publication Data
US 2017/0348950 A1 Dec. 7, 2017

(30) Foreign Application Priority Data
Dec. 31, 2014 (EP) .................................. 14382589

(51) Int. Cl.
*B32B 27/08* (2006.01)
*B32B 27/30* (2006.01)
(Continued)

(52) U.S. Cl.
CPC .......... *B32B 27/08* (2013.01); *B29B 17/0005* (2013.01); *B32B 7/12* (2013.01);
(Continued)

(58) Field of Classification Search
CPC ....... B32B 27/08; B32B 27/306; B32B 27/32; B32B 17/0005; B32B 7/12; B32B 27/34;
(Continued)

(56) References Cited

FOREIGN PATENT DOCUMENTS

WO 2010034456 A1 4/2010
WO 2012164585 A2 12/2012

OTHER PUBLICATIONS

Evans, Report code ISS001-001. "Cleaning and recycling of residual mixed plastic film". WRAP, 2011.
(Continued)

*Primary Examiner* — Michael C Miggins (57) ABSTRACT

A multi-layer structure comprising: a) at least one layer comprising a polyolefin component comprising i) 60 to 94 weight percent of a first component selected from the group consisting of ethylene homopolymer, ethylene copolymer, polypropylene homopolymer, polypropylene copolymer, and combinations thereof ii) 0-35 weight percent of a functional polymer component, and iii) 1-35 weight percent of a compatibilizer component comprising an anhydride and/or carboxylic acid functionalized ethylene/alpha-olefin interpolymer having a melt viscosity (177° C.) less than, or equal to, 200,000 cP and a density from 0.855 to 0.94 g/cc; b) at least one tie layer comprising maleic-anhydride grafted polymer with a melt index of less than 50 dg/min, wherein the tie layer does not contain the compatibilizer component; and c) at least one polar layer comprising a polar polymer, is disclosed.

12 Claims, 2 Drawing Sheets

```
┌─────────────────────────┐
│   PE + Compatibilizer   │
├─────────────────────────┤
│          Tie            │
├─────────────────────────┤
│                         │
│      EVOH or PA         │
│                         │
└─────────────────────────┘
```

(51) Int. Cl.
  *B32B 27/32* (2006.01)
  *B29B 17/00* (2006.01)
  *B32B 7/12* (2006.01)
  *B32B 27/34* (2006.01)
  *B29C 47/00* (2006.01)
  *B29K 23/00* (2006.01)
  *B29K 77/00* (2006.01)
  *B29K 105/00* (2006.01)
(52) U.S. Cl.
  CPC ............ *B32B 27/306* (2013.01); *B32B 27/32* (2013.01); *B32B 27/34* (2013.01); *B29C 47/0057* (2013.01); *B29K 2023/06* (2013.01); *B29K 2023/086* (2013.01); *B29K 2077/00* (2013.01); *B29K 2105/0005* (2013.01); *B32B 2305/70* (2013.01)
(58) Field of Classification Search
  CPC ............ B32B 2305/70; B29C 47/0057; B29K 2023/06; B29K 2023/086; B29K 2077/00; B29K 2105/0005
  See application file for complete search history.

(56) References Cited

OTHER PUBLICATIONS

McKinlay, Report code: MDP041. "Post-consumer film recycling". WRAP 2011.
Haig, Report code: IMT006-002. "Film reprocessing technologies and collection schemes" WRAP, 2012.
Morrish, Report code: MDP033. "Near infrared sorting of household plastic packaging". WRAP, 2010.
PCT/US2015/059972, Jan. 27, 2016, International Search Report and Written Opinion.
PCT/US2015/059972, Jul. 13, 2017, International Preliminary Report on Patentability.
European Patent Application No. 14382589.1 Extended Search Report dated Jun. 18, 2015.

| PE |
|---|
| PE + Compatibilizer |
| Tie |
| PA |
| EVOH |
| PA |
| Tie |
| PE + Compatibilizer |
| PE |

FIG. 4B

| PE |
|---|
| PE |
| PE + Compatibilizer |
| Tie |
| EVOH or PA |
| Tie |
| PE + Compatibilizer |
| PE |
| PE |

FIG. 4C

| PE |
|---|
| PE + Compatibilizer |
| PE |
| Tie |
| EVOH or PA |
| Tie |
| PE |
| PE + Compatibilizer |
| PE |

SELF-RECYCLABLE BARRIER PACKAGING

REFERENCE TO RELATED APPLICATIONS

The present application claims the benefit of EP Application No. 14382589.1, filed Dec. 31, 2014, which is incorporated herein by reference in its entirety.

FIELD OF THE INVENTION

The instant invention relates to multi-layer structures and the recycling thereof.

BACKGROUND

Every year, a considerable amount of flexible packaging barrier film is being disposed by landfill or incineration, due to the difficulty of dispersing typical functional barrier polymers such as Ethylene vinyl alcohol (EVOH) or Polyamide (PA) within a more conventional Polyolefin (PO) waste stream for further recycling.

Typically, flexible film converters and recyclers get value out of post industrial waste by submitting the material to a compatibility process, in which a recycling compatibilizer is added to the waste stream for further conversion of the material into pellets, allowing its reuse. However, when a post consumer barrier film structure is collected and mixed with a conventional PO waste stream it is very difficult to know when to use such compatibilizers and the amounts required.

An all-PO film structure can facilitate the recycling of waste by using only this family of raw material in its structure, therefore avoiding the compatibilizer step, however, when gas barrier is required the package will be compromised. Therefore, a solution is desired to allow the incorporation of a gas barrier material in a film structure while still allowing for recycling without the need of a secondary process.

SUMMARY OF THE INVENTION

The present invention enables improved compatibilization, when compared to adding a compatibilizer component as a separate stream in a recycling process.

In one broad embodiment of the present invention, there is disclosed a multi-layer structure comprising, consisting of, or consisting essentially of: a) at least one layer comprising a polyolefin component comprising i) 60 to 94 weight percent of a first component selected from the group consisting of ethylene homopolymer, ethylene copolymer, polypropylene homopolymer, polypropylene copolymer, and combinations thereof ii) 0-35 weight percent of a functional polymer component, and iii) 1-35 weight percent of a compatibilizer component comprising an anhydride and/or carboxylic acid functionalized ethylene/alpha-olefin interpolymer having a melt viscosity (177° C.) less than, or equal to, 200,000 cP and a density from 0.855 to 0.94 g/cc; b) at least one tie layer comprising maleic-anhydride grafted polymer with a melt index of less than 50 dg/min, wherein the tie layer does not contain the compatibilizer component; and c) at least one polar layer comprising a polar polymer, is disclosed.

In another embodiment of the present invention, there is disclosed a method for making a recycled structure comprising a) converting the above-mentioned multi-layer structure into flakes, b) optionally converting the flakes into pellets, and c) forming the recycled structure from the flakes or the pellets wherein the method does not involve the use of the compatibilizer component.

DETAILED DESCRIPTION

In one broad embodiment of the present invention, there is disclosed a multi-layer structure comprising: a) at least one layer comprising a polyolefin component comprising i) 60 to 94 weight percent of a first component selected from the group consisting of ethylene homopolymer, ethylene copolymer, polypropylene homopolymer, polypropylene copolymer, and combinations thereof, ii) 0-35 weight percent of a functional polymer component, and iii) 1-35 weight percent of a compatibilizer component comprising an anhydride and/or carboxylic acid functionalized ethylene/alpha-olefin interpolymer having a melt viscosity (177° C.) less than, or equal to, 200,000 cP and a density from 0.855 to 0.94 g/cc; b) at least one tie layer comprising maleic-anhydride grafted polymer with a melt index of less than 50 dg/min, wherein the tie layer does not contain the compatibilizer component; and c) at least one polar layer comprising a polar polymer.

Polyolefin Component Layer

The polyolefin layer comprises a first component selected from the group consisting of ethylene homopolymer (eg. DMDA-8007 NT 7 sold by The Dow Chemical Company), ethylene copolymer (eg. DOWLEX 2045 G sold by the Dow Chemical Company), polypropylene homopolymer (eg. H110-02N sold by Braskem), polypropylene copolymer (eg. DS6D81 sold by Braskem), and combinations thereof.

The first component is present in the polyolefin layer in the range of from 60 weight percent to 94 weight percent. Any and all ranges between 60 and 94 weight percent are included herein and disclosed herein, for example, the first component can be present in the range of from 65 to 90 weight percent, 70 to 87 weight percent, or 75 to 82 weight percent.

The polyolefin component can also contain a functional polymer component. Examples of polymers that can be used include, but are not limited to a maleic anhydride functionalized polyolefin (eg. AMPLIFY™ TY 1353 sold by the Dow Chemical Company), acrylate ethylene copolymer (eg. AMPLIFY™ EA 101 sold by the Dow Chemical Company), ethylene vinyl acetate (eg. ELVAX 450 sold by DuPont), and mixtures thereof.

In an embodiment, the polyolefin component comprises a blend of 5 to 30 weight percent of a sealant polymer and 70 to 95 weight percent of an ethylene homopolymer or ethylene alpha-olefin copolymer.

The functional polymer component can be present in the polyolefin layer in the range of from 0 to 35 weight percent. Any and all ranges between 0 and 35 weight percent are included herein and disclosed herein, for example, the functional polymer component can be present in the range of from 2 to 16 weight percent, 4 to 12 weight percent, or 6 to 11 weight percent.

Compatibilizer—Anhydride and/or Carboxylic Acid Functionalized Ethylene/Alpha-Olefin Interpolymer The polyolefin component further comprises a compatibilizer component which is an anhydride and/or carboxylic acid functionalized ethylene/alpha-olefin interpolymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term "anhydride and/or carboxylic acid functionalized ethylene/alpha-olefin interpolymer," as used herein, refers to an ethylene/alpha-olefin interpolymer that comprises at least one anhydride group and/or at least one acid group (for example, —COOH formed by the hydrolysis of an anhydride) linked by a covalent bond.

The compatibilizer is present in the polyolefin layer in the range of from 1 weight percent to 35 weight percent. Any and all ranges from 1 to 35 weight percent are included herein and disclosed herein, for example, the compatibilizer can be present in the polyolefin layer in the range of from 5 to 30 weight percent, 10 to 25 weight percent, or 15 to 22 weight percent.

The base polymer used to form the anhydride and/or carboxylic acid functionalized ethylene/α-olefin interpolymer is an ethylene/α-olefin interpolymer. In various embodiments, alpha olefins are C3-C20 alpha(α)-olefins. Any and all ranges between C3 and C20 are included herein and disclosed herein, for example, the α-olefins are C3-C10 α-olefins. Examples of α-olefins that can be used in the present invention include, but are not limited to propylene, 1-butene, 1-pentene, 1-hexene, 1-heptene and 1-octene, and more preferably include propylene, 1-butene, 1-hexene and 1-octene.

In one embodiment, the ethylene/α-olefin interpolymer is a homogeneously branched linear interpolymer, and further a copolymer, or a homogeneous branched substantially linear interpolymer, and further a copolymer.

In one embodiment, the ethylene/α-olefin interpolymer is a homogeneously branched linear interpolymer, and further a copolymer.

In one embodiment, the ethylene/α-olefin interpolymer is a homogeneously branched substantially linear interpolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, further from 0.01 long chain branches per 1000 total carbons to 2 long chain branch per 1000 total carbons, and further from 0.01 long chain branches per 1000 total carbons to 1 long chain branch per 1000 total carbons.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949), and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

An example of an ethylene/α-olefin copolymer is AFFINITY GA Polyolefin Plastomer available from The Dow Chemical Company, and LICOCENE Performance Polymers from Clariant. Other examples of ethylene/α-olefin polymers suitable for the invention include the ultra low molecular weight ethylene polymers described in U.S. Pat. Nos. 6,335,410, 6,054,544 and 6,723,810, each fully incorporated herein by reference.

An example of a functionalized ethylene/α-olefin copolymer is RETAIN 3000 available from The Dow Chemical Company.

In various embodiments, the anhydride and/or carboxylic acid functionality is greater than or equal to 0.5 weight percent, based on the total weight of the anhydride and/or carboxylic acid functionalized ethylene/alpha-olefin interpolymer. Any and all ranges greater than or equal to 0.5 weight percent are included herein and disclosed herein, for example, the anhydride and/or carboxylic acid functionality can be greater than or equal to 0.8 weight percent, greater than or equal to 0.9 weight percent, greater than or equal to 1.0 weight percent, from 0.6 to 1.9 weight percent, from 0.8 to 1.7 weight percent, or from 0.9 to 1.5 weight percent based on the total weight of the anhydride and/or carboxylic acid functionalized ethylene/alpha-olefin interpolymer.

In one embodiment, the anhydride and/or carboxylic acid functionalized ethylene/alpha-olefin interpolymer is grafted to the polyolefin.

In various embodiments, the anhydride and/or carboxylic acid functionalized ethylene/alpha-olefin interpolymer has a melt viscosity in the range of from 2000 cP to 50,000 cP at 350° F. (177° C.). Any and all ranges between 2000 cP and 50,000 cP are included herein and disclosed herein, for example, the melt viscosity can be in the range of from 3000 cP to 40,000 cP, from 4000 cP to 30,000 cP, or from 5000 cP to, 20,000 cP, at 350° F. (177° C.).

In one embodiment, the anhydride and/or carboxylic acid functionalized ethylene/alpha-olefin interpolymer has a density from 0.855 g/cm$^3$ to 0.940 g/cm$^3$. Any and all ranges from 0.855 g/cm$^3$ to 0.940 g/cm$^3$ are included herein and disclosed herein, for example, the anhydride and/or carboxylic acid functionalized ethylene/alpha-olefin interpolymer can have a density from 0.860 g/cm$^3$ to 0.900 g/cm$^3$, from 0.860 gm/cm$^3$ to 0.895 gm/cm$^3$, from 0.865 g/cm$^3$ to 0.890 g/cm$^3$, or from 0.865 g/cm$^3$ to 0.880 g/cm$^3$.

In one embodiment, the anhydride and/or carboxylic acid functionalized ethylene/alpha-olefin interpolymer has a molecular weight distribution (MWD) (Mw/Mn) from 1.1 to 5.0. Any and all ranges from 1.1 to 5.0 are included herein and are disclosed herein, for example, the anhydride and/or carboxylic acid functionalized ethylene/alpha-olefin interpolymer can have a MWD of from 1.3 to 4.0, 1.5 to 2.8, or 2.0 to 2.5, or from 2.0 to 3.0.

In one embodiment, the anhydride and/or carboxylic acid functionalized ethylene/alpha-olefin interpolymer has a weight average molecular weight (Mw) in the range of from 2000 g/mole to 50,000 g/mole. Any and all ranges from 2000 g/mole to 50,000 g/mole are included herein and disclosed herein, for example, the anhydride and/or carboxylic acid functionalized ethylene/alpha-olefin interpolymer can have a Mw in the range of from 3000 g/mole to 40,000 g/mole, or from 4000 g/mole to 30,000 g/mole.

In one embodiment, the anhydride and/or carboxylic acid functionalized ethylene/alpha-olefin interpolymer has a melt index (I2), or calculated melt index (I2) (2.16 kg, 190 C), in the range of from 300 g/10 min to 1500 g/10 min. Any and all ranges between 300 g/10 min and 1500 g/10 min are included herein and disclosed herein, for example, the anhydride and/or carboxylic acid functionalized ethylene/alpha-olefin interpolymer can have a melt index (I2), or calculated melt index (I2) in the range of from 400 g/10 min to 1200 g/10 min, or from 500 g/10 min to 1000 g/10 min.

In one embodiment, the anhydride and/or carboxylic acid functionalized ethylene/alpha-olefin interpolymer has a percent crystallinity, as determined by DSC, in the range of from 2 percent to 40 percent. Any and all ranges from 2% to 40% are included herein and disclosed herein, for example, the anhydride and/or carboxylic acid functionalized ethylene/alpha-olefin interpolymer can have a percent crystallinity in the range of from 5% to 30%, from 10% to 25%, or from 15% to 20%.

Tie Layer

Maleic-Anhydride Grafted Polymer

The tie layer comprises a polymer with a maleic anhydride (MAH)-grafted functionality. In a further embodiment, the MAH-graft level is from 0.05 to 1.20 weight percent, based on the weight of the MAH-grafted polymer. In a further embodiment, the MAH-graft level is from 0.07 to 1.00 weight percent, based on the weight of the MAH-grafted polymer. In a further embodiment, the MAH-graft level is from 0.10 to 0.60 weight percent, based on the weight of the MAH-grafted polymer.

In one embodiment, the tie layer is a MAH-grafted ethylene-based polymer. In a further embodiment, the MAH-grafted ethylene-based polymer has a melt index (I2) from 0.5 to 10 g/10 min, or from 1 to 6 g/10 min.

In one embodiment, the functionalized MAH-grafted ethylene-based polymer comprises at least one functional group selected from the following:

anhydride, and combinations thereof; and wherein R is hydrogen or alkyl, R' is hydrogen or alkyl. In a further embodiment, each alkyl group is, independently, methyl, ethyl, propyl or butyl. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

The addition of low levels of maleic anhydride grafted polymer into the tie layer is known in the art. The addition of a sufficient level of maleic anhydride grafted polymer to the tie layer to enable compatibilization can diminish the adhesion properties of the tie layer.

Polar Layer

The multi-layer structure also comprises a polar, or barrier layer comprising a polar polymer.

The term "polar polymer," as used herein, refers to polymer formed from at least one monomer that comprises at least one heteroatom. Some examples of heteroatoms include O, N, P and S.

In various embodiments, the polar polymer has a melt index (I2) (2.16 kg, 190° C.) from 0.1 to 40 g/10 min, further from 0.2 to 20 g/10 min, and further from 0.5 to 10 g/10 min.

In various embodiments, the polar polymer has a density from 1.00 to 1.30 g/cc, further from 1.10 to 1.20 g/cc (1 cc=1 $cm^3$).

In various embodiments, the polar polymer is selected from an ethylene vinyl alcohol polymer (EVOH) (such as Eval H171B sold by Kuraray) or polyamide (PA) (such as Nylon 6, Nylon 66, and Nylon 6/66 sold by DuPont) and combinations thereof.

In various embodiments, the at least one polar layer comprises at least one layer of EVOH.

In various embodiments, the at least one polar layer comprises at least one layer comprising a nylon selected from the group consisting of nylon 6, nylon 66, nylon 6/66 and combinations thereof.

In various embodiments, the polar layer comprises at least one layer of at least one of the above-mentioned nylon compounds and at least one layer of EVOH.

In various embodiments, the polar layer can further comprise up to 15 weight percent of the compatibilizer described above. Any and all ranges up to 15 weight percent are included herein and disclosed herein, for example, the polar layer can comprise 0.25 weight percent, 0.5 weight percent, 1 weight percent, 5 weight percent, 6 weight percent, 8 weight percent, or 10 weight percent of the compatibilizer component.

To one skilled in the art it is known that the incorporation of a recycle compatibilizer component could be added to any layers of the multi-layer structure. Surprisingly, addition to specific layers is required to achieve the targeted film performance. The addition of low levels of maleic anhydride grafted polymer into the polar polymer layer is known in the art. The addition of a sufficient level of maleic anhydride grafted polymer to the polar polymer layer to enable compatibilization can diminish the properties of the polar polymer.

Figure 1:
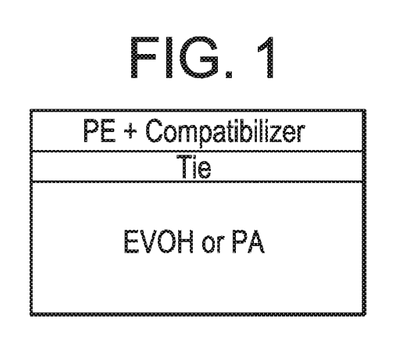
FIG. 1 shows a 3-layer structure embodiment

The figures show several embodiments of the present invention. FIG. 1 shows a three-layer structure, with a polyolefin layer comprising a polyethylene and compatibilizer component, a tie layer, and a polar layer comprising EVOH or PA.

Figure 2A:
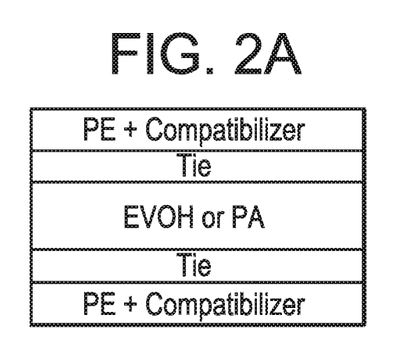
FIGS. 2a and 2b show embodiments of 5-layer structures
Figure 2B:
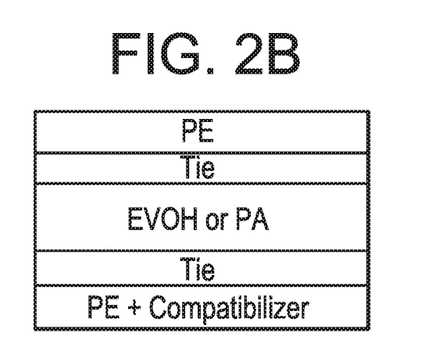

FIGS. 2a and 2b each show 5-layer structures. In FIG. 2a, there is a polyolefin layer comprising a polyethylene and a compatibilizer component, a tie layer, a polar layer comprising EVOH or PA, a second tie layer, and a second polyolefin layer comprising EVOH or PA. FIG. 2b shows a 5-layer structure with a polyolefin layer comprising a polyethylene, a tie layer, a polar layer comprising EVOH or PA, a second tie layer, and a polyolefin layer comprising a polyethylene and a compatibilizer component.

Figure 3A:
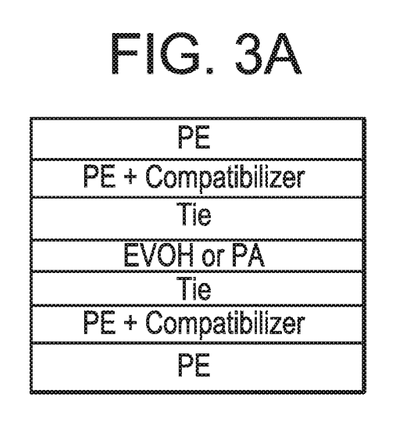
FIGS. 3a and 3b show embodiments of 7-layer structures
Figure 3B:
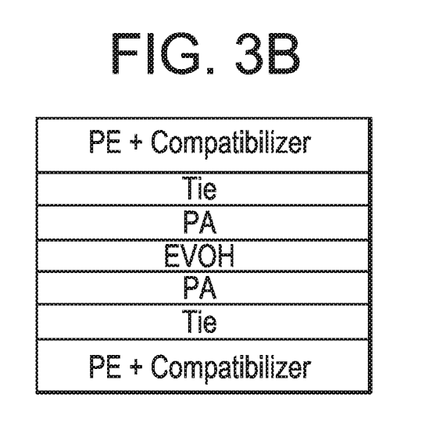

FIGS. 3a and 3b show 7-layer structures. In FIG. 3a, there is a polyolefin layer comprising a polyethylene, a polyolefin layer comprising a polyethylene and a compatibilizer component, a tie layer, a polar layer comprising EVOH or PA, another tie layer, a polyolefin layer comprising a polyethylene and a compatibilizer component, and a polyolefin layer comprising a polyethylene. FIG. 3b shows a 7-layer structure with a polyolefin layer comprising a polyethylene and a compatibilizer, a tie layer, a polar layer comprising PA, a polar layer comprising EVOH, another polar layer comprising PA, another tie layer, and another polyolefin layer comprising a polyethylene and a compatibilizer component.

Figure 4A:
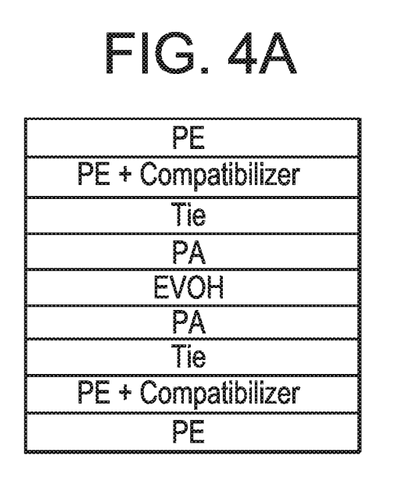
FIGS. 4a, 4b, and 4c show embodiments of 9-layer structures
Figure 4B:
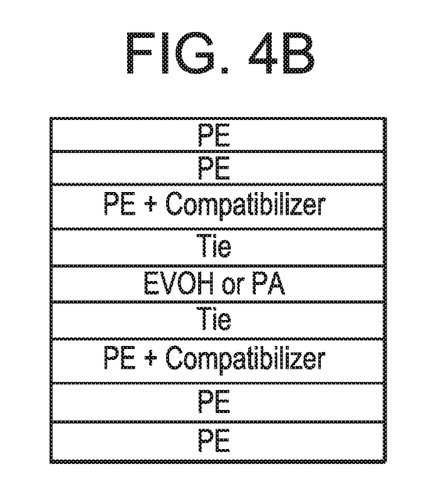
Figure 4C:
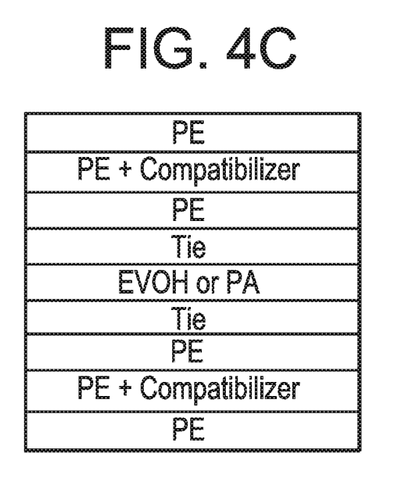

FIGS. 4a, 4b, and 4c show 9-layer structure embodiments. In FIG. 4a, there is a polyolefin layer comprising a polyethylene, a polyolefin layer comprising a polyethylene and a compatibilizer component, a tie layer, a polar layer comprising PA, a polar layer comprising EVOH, a second polar layer comprising PA, a second tie layer, a second polyolefin layer comprising a polyethylene and a compatibilizer component, and a second polyolefin layer comprising a polyethylene. FIG. 4b shows a 9-layer structure with a polyolefin layer comprising a polyethylene, a second polyolefin layer comprising a polyethylene, a polyolefin layer comprising a polyethylene and a compatibilizer component, a tie layer, a polar layer comprising EVOH or PA, a second tie layer, a second polyolefin layer comprising polyethylene and a compatibilizer component, a third polyolefin layer comprising a polyethylene, and a fourth polyolefin layer comprising a polyethylene. FIG. 4c shows a nine-layer structure with a polyolefin layer comprising a polyethylene, a polyolefin layer comprising a polyethylene and a compatibilizer component, a second polyolefin layer comprising a polyethylene, a tie layer, a polar layer comprising EVOH or PA, a second tie layer, a third polyolefin layer comprising a polyethylene, a second polyolefin layer comprising a polyethylene and a compatibilizer component, and a fourth polyolefin layer comprising a polyethylene.

The multi-layer structures can be used for a variety of applications including, but not limited to film applications such as flexible films, semi-flexible films, rigid films, and semi-rigid films. Films can be prepared by any method known to those skilled in the art. The multi-layer structures or self-recyclable films disclosed herein may be converted into films, sheet, or rigid structures.

Recycling Method

In various embodiments, this invention discloses a method for making a recycled structure comprising a) converting the multi-layer structure of any previous embodiment into flakes, b) optionally converting the flakes into pellets, and c) forming the recycled structure from the flakes or the pellets wherein the method does not involve the addition of a compatibilizer component during this unit operation.

In another embodiment, this invention discloses a method for making a recycled structure comprising a) continuously transferring the edge trim from a blown or cast film process directly back into the feed stream, b) optionally combining the trim with other polymers to form a layer in a multi-layer structure.

The recycled structure can be formed from the flakes and/or pellets by undergoing any useful process known to those skilled in the art. These processes include, but are not limited to an extrusion process, a blown-film process, a cast-film process, and combinations thereof.

EXAMPLES

Materials

Materials are shown in Table 1 below.

TABLE 1

Materials used in the Examples

| Material | Density (g/cm$^3$) | Melt Index (g 10/min) | Comments |
|---|---|---|---|
| RETAIN 3000 | 0.87 | 660 | Recycle Compatibilizer (RC). Maleic anhydride (MAH) grafted ethylene-octene plastomer |
| Dowlex 5056G | 0.919 | 1.1 | LLDPE |
| AMPLIFY ™ TY 1353 | 0.921 | 2.0 | MAH grafted polymer |
| EVAL F171B | 1.19 | 1.6 | Ethylene Vinyl-Alcohol Copolymer. 32 mol % Ethylene content |

Examples 1-3 and Comparative Examples A-C

Sample Preparation and Recycling Process

A control multi-layer film sample which contained EVOH, tie layers, and outer polyolefin layers is compared to a self-recyclable multi-layer structure which contained EVOH, tie layers, and an outer polyolefin layer that was a blend of polyolefin and the recycle compatibilizer, Table 2. Both films are 5 layer A/B/C/B/A structures with an overall thickness of 100 microns, distributed as 42.5/5/5/5/42.5 micron layers. These structures were produced on a Collin co-extrusion blown film line. These samples were designated as the "original film structures", since they would be later submitted to a recycling process and correspond to the structure depicted in FIG. 2a. Table 2 shows the designed structures.

TABLE 2

Designed original film structures

| Structures | Layer | Comparative Example A | Inventive Example 1 |
|---|---|---|---|
| A/B/C/B/A 100μ 42.5/5/5/5/42.5μ (42.5/5/5/5/42.5%) | A | Dowlex 5056G | 94% Dowlex 5056G + 6% RETAIN 3000 |
| | B | Amplify TY 1353 | Amplify TY 1353 |
| | C | EVAL F171B | EVAL F171B |

The ratio EVAL F171B:RETAIN 3000 for this study was 1:1, meaning that the amount of EVOH within these structures was 5%, while the amount of built-in compatibilizer within the self recyclable structure was 5% which was evenly split between the two outer layers.

The original film structures were ground in a Mateu & Sole grinder machine, a machine composed of rotary blades designed to reduce fed film into flakes of approximately 0.5×0.5 cm, by cutting and compressing the film against the drum.

Once the films were converted into flakes, they were then processed on a Buss kneader-compounder in order to convert the flakes to pellets.

Monolayer and 3 layer film structures were produced on a Collin co-extrusion blown film line using a 2.5 BUR and a 1.8 mm die gap. Prior to the extrusion process, the pellets were dried overnight in a lab oven at 100° C. to remove any remaining moisture.

The films produced are shown in Table 3.

TABLE 3

Recycled Monolayer and 3 Layer Films

| Monolayer Films 50μ | | 3 Layer films (A/B/A) 50μ (15/20/15μ) | |
|---|---|---|---|
| Comparative Example B | Inventive Example 2 | Comparative Example C | Inventive Example 3 |
| 100% recycled Comparative Example A | 100% recycled Inventive Example 1 | Layer A = Dowlex 5056 Layer B = Recycled Comparative Example A | Layer A = Dowlex 5056 Layer B = Recycled Inventive Example 1 |

The extrusion conditions for these samples are shown in Table 4.

TABLE 4

Extruding Conditions Collin co-extrusion blown film line

| | Units | Comp Ex A | Inv Ex 1 | Comp Ex B | Inv Ex 2 | Comp Ex C | Inv Ex 3 |
|---|---|---|---|---|---|---|---|
| Amps - Ext. A | A | 4 | 2.7 | 8 | 8.3 | 3.3 | 3.4 |
| Amps - Ext. B | A | 2.2 | 2.4 | — | — | 5.2 | 6.3 |
| Amps - Ext. C | A | 1 | 0.9 | — | — | 3.3 | 3.1 |
| Amps - Ext. D | A | 3.7 | 3.1 | — | — | — | — |
| Layer Percentage - Ext. A | % | 42 | 42 | 100 | 100 | 30 | 30 |
| Layer Percentage - Ext. B | % | 10 | 10 | — | — | 40 | 40 |
| Layer Percentage - Ext. C | % | 5 | 5 | — | — | 30 | 30 |
| Layer Percentage - Ext. D | % | 42 | 42 | — | — | — | — |
| Melt Pressure - Ext. A | bar | 213 | 179 | 278 | 273 | 203 | 208 |
| Melt Pressure - Ext. B | bar | 48 | 44 | — | — | 184 | 214 |
| Melt Pressure - Ext. C | bar | 52 | 46 | — | — | 162 | 165 |
| Melt Pressure - Ext. D | bar | 173 | 155 | — | — | — | — |
| Melt Temperature - Ext. A | ° C. | 248 | 248 | 221 | 223 | 235 | 234 |
| Melt Temperature - Ext. B | ° C. | 235 | 235 | — | — | 221 | 203 |
| Melt Temperature - Ext. C | ° C. | 225 | 226 | — | — | 228 | 228 |
| Melt Temperature - Ext. D | ° C. | 242 | 241 | — | — | — | — |
| RPM - Ext. A | rpm | 90 | 90 | 85 | 85 | 68 | 65 |

TABLE 4-continued

Extruding Conditions Collin co-extrusion blown film line

|  | Units | Comp Ex A | Inv Ex 1 | Comp Ex B | Inv Ex 2 | Comp Ex C | Inv Ex 3 |
|---|---|---|---|---|---|---|---|
| RPM - Ext. B | rpm | 12 | 12 | — | — | 45 | 45 |
| RPM - Ext. C | rpm | 6 | 5 | — | — | 68 | 65 |
| RPM - Ext. D | rpm | 92 | 92 | — | — | — | — |
| Take-off speed | m/min | 3.4 | 3.3 | 5.2 | 5.2 | 6.8 | 6.8 |
| Total Output | kg/h | 10 | 10 | 8 | 8 | 10 | 10 |

Table 5 shows the operating conditions for the Buss compounder.

TABLE 5

Operating conditions for Buss kneader compounder

| | Units | Pellets derived from Comp Ex A | Pellets derived from Inv Ex 1 |
|---|---|---|---|
| Kneader Motor Current | A | 13 | 13 |
| Kneader Speed | Rpm | 120 | 120 |
| Motor Current | A | 3 | 3 |
| Output Rate | Kg/h | 4 | 4 |
| Screw Speed | Rpm | 45 | 30 |
| Thermocouple K1 | ° C. | 75 | 75 |
| Thermocouple K2 | ° C. | 150 | 150 |
| Thermocouple K3 | ° C. | 170 | 170 |
| Thermocouple K5 | ° C. | 130 | 130 |
| Thermocouple K4 | ° C. | 135 | 135 |

The mechanical and optical properties of the recycled monolayer structures are presented in Table 6.

TABLE 6

Properties of monolayer recycled films

| Test | Comparative Example B | Inventive Example 2 |
|---|---|---|
| Dart Drop Impact (g) | 342 | 305 |
| Elmendorf Tear CD (g) | 1.060 | 1.320 |
| Elmendorf Tear MD (g) | 893 | 1.050 |
| Gloss 45° (Gloss) | 30.4 | 64.5 |
| Haze (%) | 30.9 | 13.1 |

The physical properties for the Example B and the Inventive Example 2 are compared. The CD and MD tear properties are improved. The optical properties measured, Gloss and Haze, are significantly improved in Inventive Example 2 without the inclusion of a distinct unit operation step where the recycle compatibilizer is added.

Table 7 shows the mechanical and optical properties of the 3 layer film structures with recycled materials in the core layer.

TABLE 7

Properties of 3 layer films with recycled material in the core layer

| Test | Comparative Example C<br>A/B/A<br>A = Dowlex 5056<br>B = Recycled<br>Comparative Example A | Inventive Example 3<br>A/B/A<br>A = Dowlex 5056<br>B = Recycled<br>Inventive Example 1 |
|---|---|---|
| Dart Drop Impact (g) | 377 | 319 |
| Elmendorf Tear CD (g) | 1.160 | 1.210 |
| Elmendorf Tear MD (g) | 984 | 1.020 |
| Gloss 45° (Gloss) | 78.4 | 76.9 |
| Haze (%) | 7.9 | 7.2 |

When comparing the 3 layer structure with the recycled control sample (Comparative Example A) and the 3 layer structure with the Inventive Example 1 in the core layer, an improvement in mechanical properties can be observed.

Other test methods used in these examples are listed in Table 8.

TABLE 8

Mechanical Properties Tests

| Test | Method |
|---|---|
| Dart Drop Impact | ASTM D 1709 |
| Elmendorf Tear | ASTM D 1922 |
| Gloss 45° | ASTM D2457 |
| Haze | ASTM D1003 |
| Density | ASTM 792-08 |
| Melt Index | ISO 1133 |

Examples 4-7 and Comparative Examples D-E

Sample Preparation and Recycling Process

A control multi-layer film simple which contained EVOH, tie layers and outer polyolefin layers is compared to two self recyclable multilayer structures which contained EVOH, tie layers and outer layers comprised of polyolefin and a blend of polyolefin and the recycle compatibilizer, as seen in Table 9.

All films are 7 layer A/B/C/D/C/B/A structures with and overall thickness of 100 microns distributed as 20/22,5/5/5/5/22,5/20 micron layers. These structures were produced on a Alpine co-extrusion blown film line. These structures are designated as the "original films structures", since they would be later submitted to a recycling process.

TABLE 9

Original film structures

| Structures | Layer | Comparative Example D | Inventive Example 4 | Inventive Example 5 |
|---|---|---|---|---|
| A/B/C/D/<br>C/B/A 100μ<br>20/22.5/5/<br>5/22.5/20μ<br>(20/22.5/5/<br>5/22.5/20%) | A | Dowlex 2056G | 94% Dowlex 2056 + 6% RETAIN 3000 | Dowlex 2056G |
| | B | Dowlex 2056G | 94% Dowlex 2056 + 6% RETAIN 3000 | 89% Dowlex 2056 + 11% RETAIN 3000 |
| | C | Amplify TY 1353 | Amplify TY 1353 | Amplify TY 1353 |
| | D | EVAL F171B | EVAL F171B | EVAL F171B |

The ratio EVAL F171B:RETAIN 3000 was 1:1 in both of the inventive examples, meaning that the amount of EVOH within these structures was 5% while the amount of built-in compatibilizer within the self recyclable structures was 5%.

In the first example, the compatibilizer was evenly split between the two B layers and in the second example it was evenly split between the four outer layers (A and B).

The original film structures were ground up to produce film flakes and then processed on a Buss kneader-compounder in order to convert the film flakes into pellets. The produced pellets were dried overnight in an oven at 100° C. to remove any remaining moisture and then Monolayer films were produced on a Collin blown film line. The films produced are shown in Table 10.

TABLE 10

| Recycled monolayer films Recycled monolayer films 50μ | | |
|---|---|---|
| Comparative Example E | Inventive Example 6 | Inventive Example 7 |
| 100% recycled Comparative Example D | 100% recycled Inventive Example 4 | 100% recycled Inventive Example 5 |

The gel count data (a gel is considered as an imperfection in the films) of the recycled monolayer structures was measured using the Dow method DOWM 101898-I12H and is presented in Table 11.

TABLE 11

| Gel count data | | | |
|---|---|---|---|
| gel size (μ) | Comparative Example E (Gel/m²) | Inventive Example 6 (Gel/m²) | Inventive Example 7 (Gel/m²) |
| 64 | 763.67 | 34.98 | 237.90 |
| 100 | 422.32 | 34.98 | 119.95 |
| 200 | 515.78 | 50.48 | 156.43 |
| 300 | 139.44 | 20.49 | 50.98 |
| 400 | 41.48 | 15.49 | 19.99 |
| 500 | 13.99 | 5.00 | 10.00 |
| 800 | 8.5 | 4.50 | 6.00 |
| 1000 | 1.00 | 0 | 1.50 |
| 1200 | 0 | 0 | 0 |
| 1200 | 0 | 0 | 0 |
| Total | 1906.18 | 165.92 | 602.75 |

Gel data for Comparative Example E and Inventive Examples 6 and 7 were compared. Gel level in the recycled films was significantly reduced, and thus, increasing the quality of the recycled films without the inclusion of a distinct unit operation step where the recycle compatibilizer was added.

The invention claimed is:

1. A multi-layer structure comprising:
 a) at least one layer comprising a polyolefin component comprising
  i) 60 to 94 weight percent of a first component selected from the group consisting of ethylene homopolymer, ethylene copolymer, polypropylene homopolymer, polypropylene copolymer, and combinations thereof
  ii) 0-35 weight percent of a functional polymer component, and
  iii) 1-35 weight percent of a compatibilizer component comprising an anhydride and/or carboxylic acid functionalized ethylene/alpha-olefin interpolymer having a melt viscosity (177° C.) less than, or equal to, 200,000 cP and a density from 0.855 to 0.94 g/cc;
 b) at least one tie layer comprising maleic-anhydride grafted polymer with a melt index of less than 50 dg/min, wherein the tie layer does not contain the compatibilizer component; and
 c) at least one polar layer comprising a polar polymer.

2. The multi-layer structure of claim 1, wherein the ratio of the compatibilizer component to the polar polymer is in the range of 0.2-4.0:1.0 by weight.

3. The multi-layer structure of claim 1, wherein the polar layer comprises a layer of EVOH.

4. The multi-layer structure of claim 1, wherein the polar layer comprises a layer comprising a nylon selected from the group consisting of nylon 6, nylon 66, nylon 6/66 and combinations thereof.

5. The multi-layer structure of claim 1, wherein the polar layer comprises at least one layer of EVOH and at least one layer of a nylon selected from the group consisting of nylon 6, nylon 66, nylon 6/66 and combinations thereof.

6. The multi-layer structure of claim 1 wherein the functional polymer component is selected from the group consisting of a maleic anhydride functionalized polyolefin, acrylate ethylene copolymer, ethylene vinyl acetate, and mixtures thereof.

7. An article prepared from the multi-layer structure of claim 1.

8. The multi-layer structure of claim 1, wherein the ethylene homopolymer or ethylene alpha-olefin copolymer is selected from the group consisting of homopolymer polyethylene, an ethylene alpha-olefin copolymer, polypropylene, random polypropylene, and mixtures thereof.

9. The multi-layer structure of claim 8, wherein the polyolefin component comprises a blend of 5 to 30 weight percent of a sealant polymer and 70 to 95 weight percent of the ethylene homopolymer or ethylene alpha-olefin copolymer.

10. A method for making a recycled structure comprising
 a) converting the multi-layer structure of claim 1 into flakes
 b) optionally converting the flakes into pellets
 c) forming the recycled structure from the flakes or the pellets
wherein the method does not involve the use of the compatibilizer component.

11. The method of claim 10, wherein the flakes and/or pellets form the recycled structure in step c) by i) continuously transferring edge trim from a blown or cast film process directly back into the feed stream, and ii) optionally combining the trim with other polymers to form a layer in a multi-layer structure.

12. A film having at least one layer which comprises the recycled structure of claim 10.

* * * * *